United States Patent [19]
Colburn

[11] Patent Number: 5,845,940
[45] Date of Patent: Dec. 8, 1998

[54] FUEL TANK MOUNT FOR FORKLIFT TRUCKS WITH A DAMPED SWING ARM SWINGABLE ALONG A TILTED ARC

[75] Inventor: Eric Richard Colburn, Wexford, Pa.

[73] Assignees: Daewoo Heavy Industries Ltd., Incheon, Rep. of Korea; Daewoo Equipment Corporation, Warrensville Heights, Ohio

[21] Appl. No.: 763,491

[22] Filed: Dec. 11, 1996

[51] Int. Cl.$^6$ ............................................. B60P 3/22
[52] U.S. Cl. .......................................... 280/830; 280/834
[58] Field of Search ................................... 280/830, 834, 280/838; 16/281, 286

[56] References Cited

U.S. PATENT DOCUMENTS

| | | | |
|---|---|---|---|
| 3,790,183 | 2/1974 | Price | 280/5 |
| 4,025,080 | 5/1977 | Gedeon | 280/5 |
| 4,846,499 | 7/1989 | Izumi et al. | 280/830 |
| 5,634,665 | 6/1997 | Jung | 280/834 |

OTHER PUBLICATIONS

U.S. application No. 08/520,587, Jung, filed Aug. 30, 1995.

Primary Examiner—Robert J. Oberleitner
Assistant Examiner—Tyrone M. Lee
Attorney, Agent, or Firm—Lowe Hauptman Gopstein Gilman & Berner

[57] ABSTRACT

A fuel tank mount for forklift trucks is adapted to hold a fuel tank over the top of a counterweight in a manner that the tank may be easily lifted up and lowered down. The fuel tank mount includes a swing arm replaceably carrying the fuel tank and mounted to the counterweight for swinging movement about a tilted pivot axis between a home position wherein the fuel tank is held over and laterally across the counterweight, a neutral position wherein the fuel tank remains at its highest elevation and a tank changing position wherein the fuel tank is oriented substantially vertically. The pivot axis remains tilted both forwards at a first tilt angle, e.g., 26 degrees, and outboards at a second tilt angle, e.g., 25 degrees, with respect to a vertical axis. A latch is provided to keep the swing arm in the home position against unwanted swinging movement into the neutral and the tank changing positions. The motion of the swing arm is damped by dint of an extension spring and an extension damper to help the operator lift the fuel tank.

26 Claims, 12 Drawing Sheets

FUEL TANK MOUNT FOR FORKLIFT TRUCKS WITH A DAMPED SWING ARM SWINGABLE ALONG A TILTED ARC

FIELD OF THE INVENTION

The present invention is generally directed to liquid propane powered forklift trucks and, more specifically, to a fuel tank mount for the forklift trucks of the type having a tank carrying, damped, swing arm swingable about a tilted pivot axis with reduced lift forces between an upper home position and a lower tank changing position to thereby ease the task of loading and unloading the fuel tank.

DESCRIPTION OF THE PRIOR ART

As is generally known in the art, conventional forklift trucks include a vehicle frame, a mast attached to the front end of the vehicle frame, a fork carriage adapted for elevational movement along the mast to raise and lower loads and a counterweight located at the rear end of the vehicle frame for retaining balance of the forklift truck as heavyweight loads are lifted up and lowered down. Mounted substantially at the center of the vehicle frame is an engine which will be kept covered with a hood or bonnet. A driver's seat is fixedly secured to the hood and surrounded by an overhead guard which defines a cabin of the trucks. In case of a liquid propane powered forklift truck, it would be necessary to replaceably mount a fuel tank, e.g., liquid propane tank, over the counterweight in a manner that the fuel tank lies on its side and is tied up with a bander or clamp. At the time when the fuel tank runs dry, the bander is untied to permit replacement of the fuel tank with a full one.

There occur frequently such instances where the hood is opened for the operator to gain access to an engine room provided under the hood. The fuel tank held above the counterweight will at this time hinder the backward swing of the seat and thus heavily restrict the opening angle of the hood. In other words, the hood cannot be fully opened without removing the fuel tank prior to the backward opening of the hood. To assure that the hood be opened to its full opening angle, therefore, it is required to remove the fuel tank beforehand into a position wherein no physical interference may take place between the seat and the fuel tank.

As a solution to this problem, use has been made of a fold-back type fuel tank mount that enables a fuel tank to be moved rearwardly from its home position in advance of a hood being opened. The fold-back type fuel tank mount includes a base plate attached to a counterweight of the forklift truck, a swingable cradle lying above the base plate and having a bander with which the fuel tank may be tied up, a hinge for coupling the swingable cradle to the base plate and a latch adapted to retain the swingable cradle against any unwanted swinging movement with respect to the base plate. In operation, pulling backward the fuel tank with the latch released will cause the swingable cradle to turn rearwardly about a horizontal hinge axis so that the fuel tank is removed out of the home position to permit full opening of the hood.

Due mainly to the heavyweight nature of the fuel tank, the fold-back type fuel tank mount stated above tends to pose a drawback in that, in the process of swinging the cradle together with the fuel tank, a significant magnitude of mechanical shock may occur with the result that parts or components are subjected to deformation and even breakage. An attempt has been made to avoid such drawback in U.S. patent application Ser. No. 08/520,587, which discloses a sliding type fuel tank mount including a fixed plate attached to the counterweight of a forklift truck and a movable plate supporting the fuel tank thereon and adapted for backward sliding movement with respect to the fixed plate to leave a room for accommodation of a seat-carrying hood when the latter is to be opened.

With the prior art fuel tank mounts as referred to hereinabove, as the fuel tank runs dry, it is usually the responsibility of the operator to replace the empty tank with a full one. This requires six steps: (i) Disconnect a feed hose leading from the tank to an engine; (ii) Unclamp the empty tank from its cradle; (iii) Lift and remove the empty tank; (iv) Lift a new tank and place it in the cradle; (v) Clamp the new tank in place; and (vi) Connect the feed hose to the new tank.

The tank replacing procedure entails a difficult and potentially dangerous task. The main difficulty with this procedure lies in steps (iii) and (iv) wherein the operator must lift the fuel tank from the ground to a height of 120 cm or more. Empty liquid propane tanks normally weigh between 8.5 and 22 kg, full tanks weighing about 17.5 to 41 kg. With the fuel tank held at chest level or higher, the operator has to extend the tank over the counterweight to drop it into the cradle, in which process the risk of injury to the operator is significant. Some operators consider heaving the tank onto the truck to be a "macho" part of the job. But with more women drivers being hired and the tightening of union rules and government safety regulations, there is a need for an improved fuel tank mount that ease the task of loading and unloading fuel tanks.

SUMMARY OF THE INVENTION

Accordingly, it is an object of the invention to provide a fuel tank mount for forklift trucks that can significantly reduce the force needed to lift a fuel tank and positively guide the fuel tank in the lift process, thus easing the task of loading and unloading the fuel tank.

Another object of the invention is to provide a fuel tank mount for forklift trucks that permits the operator to raise and lower a fuel tank with reduced physical force and controlled speed, substantially eliminating the risk of injury in a fuel tank changing process.

With these objects in mind, the present invention provides a fuel tank mount for forklift trucks adapted to hold a fuel tank in place, comprising: a counterweight; a swing arm replaceably carrying the fuel tank and pivotally mounted to the counterweight for rotation about a tilted pivot axis between a home position wherein the tank is held above and laterally across the counterweight, a neutral position wherein the tank remains at its highest elevation and a tank changing position wherein the tank lies alongside the counterweight; and means for limiting the rotation of the swing arm as the arm is subjected to rotation from the neutral position into the home position and the tank changing position.

One of the key but not exclusive innovative features lies in that the pivot pin is tilted both forwards at a first tilt angle and outboards at a second tilt angle, enabling the swing arm to describe a tilted arc while moving from the home position to the tank changing position. Another feature resides in the provision of an extension spring counterbalancing the weight of the arm and the tank and an extension damper helping control the speed of rotation of the swing arm.

BRIEF DESCRIPTION OF THE DRAWINGS

The above and other objects, features, advantages of the invention will become apparent from a review of the following detailed description of the preferred embodiment taken in conjunction with the accompanying drawings, in which.

DETAILED DESCRIPTION OF THE PREFERRED EMBODIMENT

Figure 1:
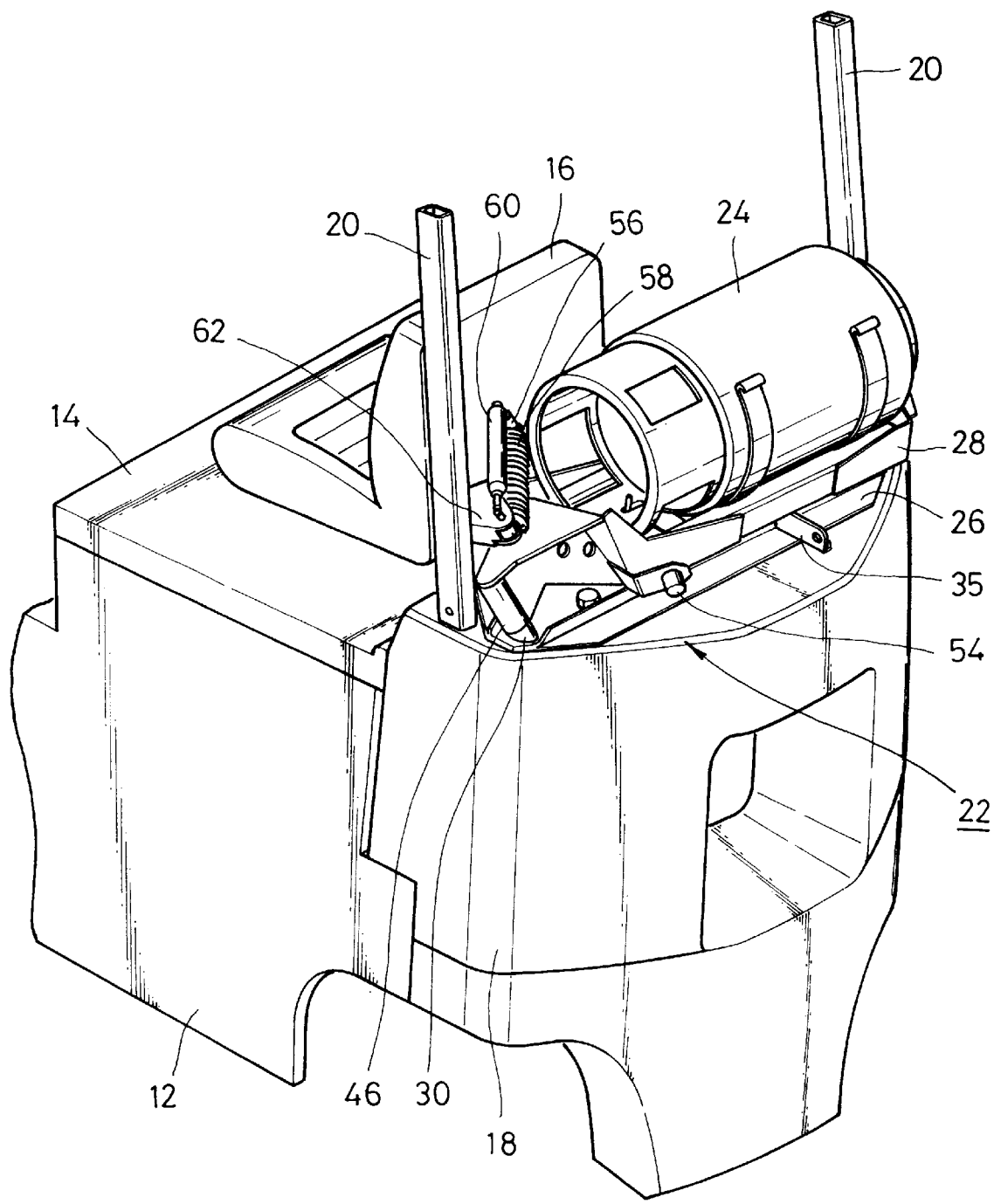
FIG. 1 is a perspective view showing a forklift truck carrying a fuel tank mount in accordance with the invention, with portions of the truck removed for simplification.

Referring first to FIG. 1, it will be noted that a typical liquid propane powered forklift truck is shown schematically with portions thereof removed for the sake of simplified illustration. As shown, the forklift truck includes among other things a vehicle frame 12 and a hood 14 hinged to the vehicle frame 12 such that it can be opened backwards to provide access to an engine room at the center of the vehicle frame 12. The hood 14 is designed to carry an operator's seat 16 on the top thereof which would be swung backwards together with the hood 14 as the latter is opened by the operator. Mounted at the rear of the vehicle frame 12 is a counterweight 18 which has generally flat top and opposite flank sides. Overhead guard beams 20 extend upwards from the top of the counterweight 18 at opposite lateral edges thereof.

In the embodiment illustrated in FIG. 1, a fuel tank mount 22 of the instant invention is provided over the top of the counterweight 18 so as to replaceably hold a fuel tank 24, e.g., liquid propane tank, in between the overhead guard beams 20. The inventive fuel tank mount 22 includes a base plate 26 fixedly secured to the top of the counterweight 18 with suitable fastener means and a tank carrying swing arm 28 swingably supported on the base plate 26. As will be set forth later in detail, the fuel tank mount 22 is of such geometry as to assist the operator by reducing the force needed to lift the fuel tank 24 and by guiding the fuel tank 24 during the substantially full process of the lift. Moreover, the fuel tank mount 22 may be used to allow the fuel tank 24 to be swung out from the counterweight 18 to provide room for the seat to pivot through between the overhead guard beams 20 and over the counterweight 18 when the hood 14 is opened.

Figure 2:
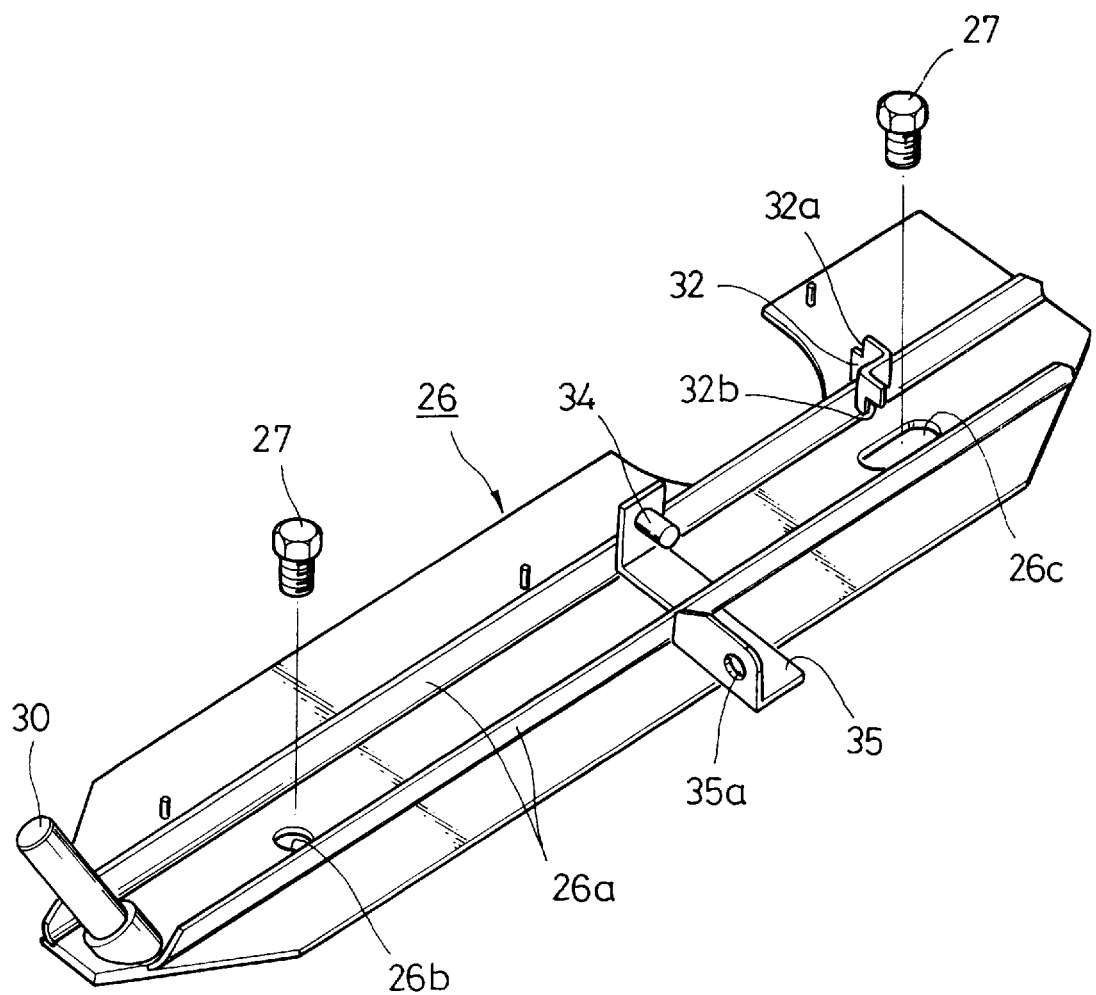
FIG. 2 is a perspective view illustrating a base plate fixedly mounted on the top of a counterweight by a pair of bolts.
Figure 4:
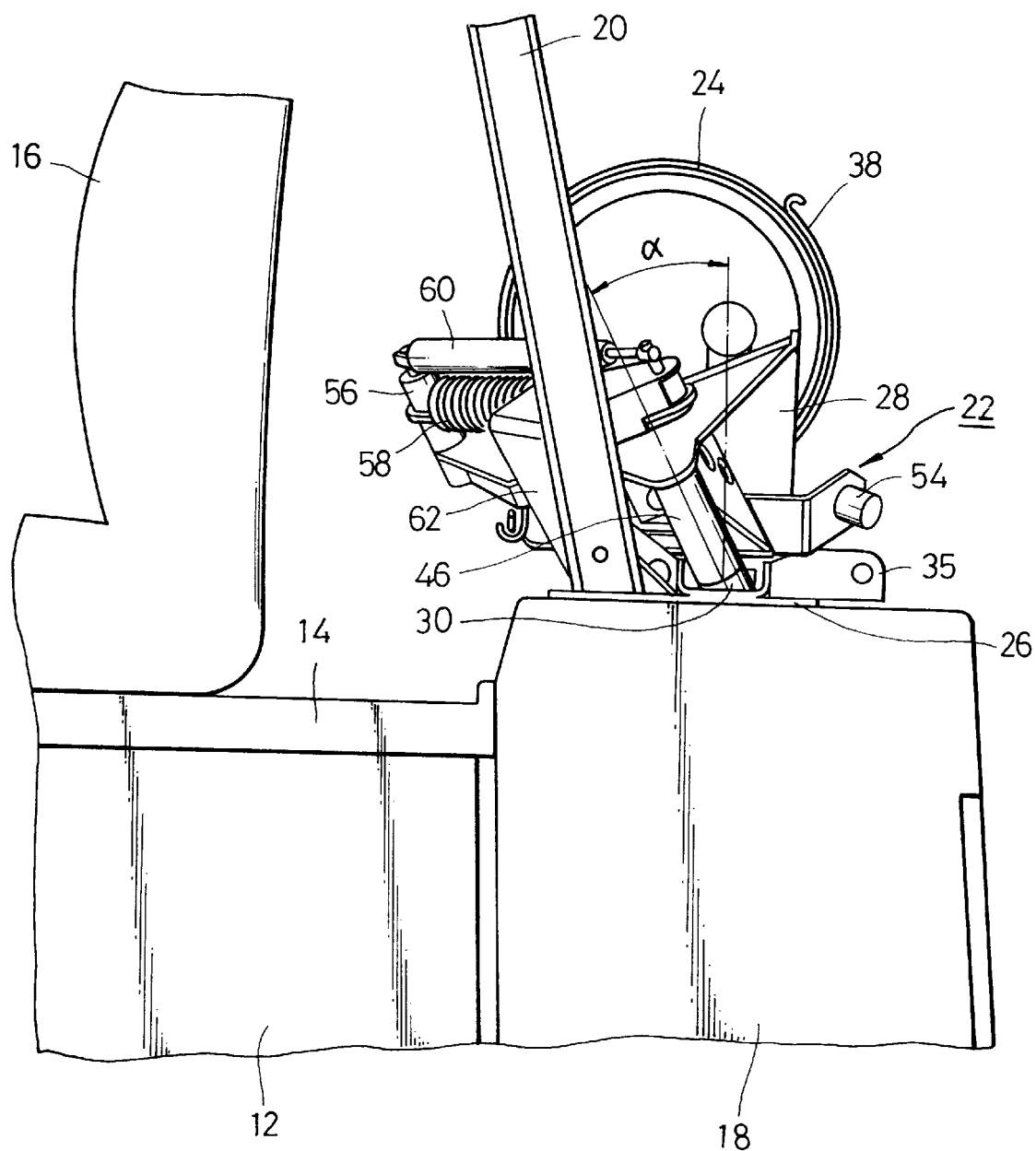
FIG. 4 is a side elevational view of the fuel tank mount attached at the rear of the forklift truck, best illustrating the forward tilt angle of a pivot axis.
Figure 5:
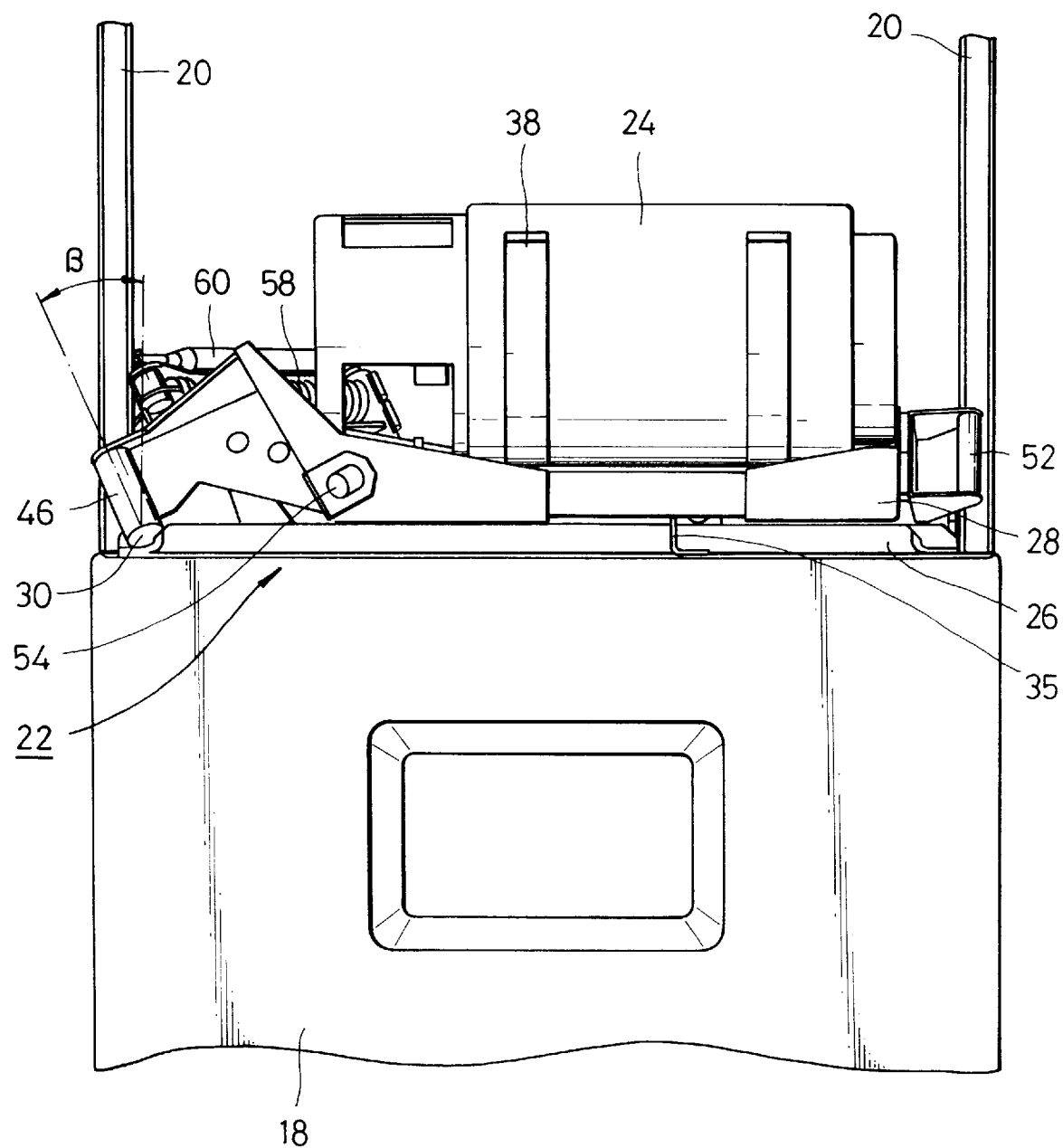
FIG. 5 is a rear elevational view of the forklift truck carrying the fuel tank mount, best showing the outboard tilt angle of the pivot axis.

As best shown in FIG. 2, the base plate 26 has a pair of parallel ribs 26a running from one end to the other end thereof and a through-hole 26b and a slot 26c through which bolts 27 may pass and then threadedly affixed to the counterweight 18 to hold the base plate 26 in place. Projecting upwards at one end of the base plate 26 is a pivot pin 30 whose axis is tilted both forwards and outboards with respect to a vertical axis. The forward tilt angle $\alpha$ of the pivot pin 30 should preferably be about 26 degrees as clearly indicated in FIG. 4, while the outboard tilt angle $\beta$ thereof should preferably be about 25 degrees as seen in FIG. 5.

A cross piece 32 is welded to the base plate 26 at a location adjacent to the other end of the plate 26. The cross piece 32 may preferably be made of generally "S" shaped steel plate and has a stop edge 32a at its forward end that extends vertically with respect to the base plate 26. At its rear end, the cross piece 32 is provided with a depressor edge 32b that runs generally horizontally in parallel with the base plate 26. As will be noted infra, the stop edge 32a of the cross piece 32 plays a role in latching the swing arm 28 over the base plate 26, while the depressor edge 32b is used to hold down the swing arm 28. Somewhere on the base plate 26 between the pivot pin 30 and the cross piece 32, there may be provided a stop bumper 34 to cushion the last part of up-swing motion of the swing arm 28. And a catch 35 with an aperture 35a is affixed to the rear edge of the base plate 26.

While the base plate 26 described above is necessary for retrofitting the existing trucks, namely, for attaching the pivot pin 30, the cross piece 32 and other parts to the counterweight of the existing trucks, it is envisioned that new trucks may eliminate this need by incorporating a pivot pin and a cross piece in their counterweight or roll cage. This means that attaching the pivot pin 30 and the cross piece 32 directly to the counterweight 18 with no base plate should fall within the scope of the invention as defined in the claims.

Figure 3:
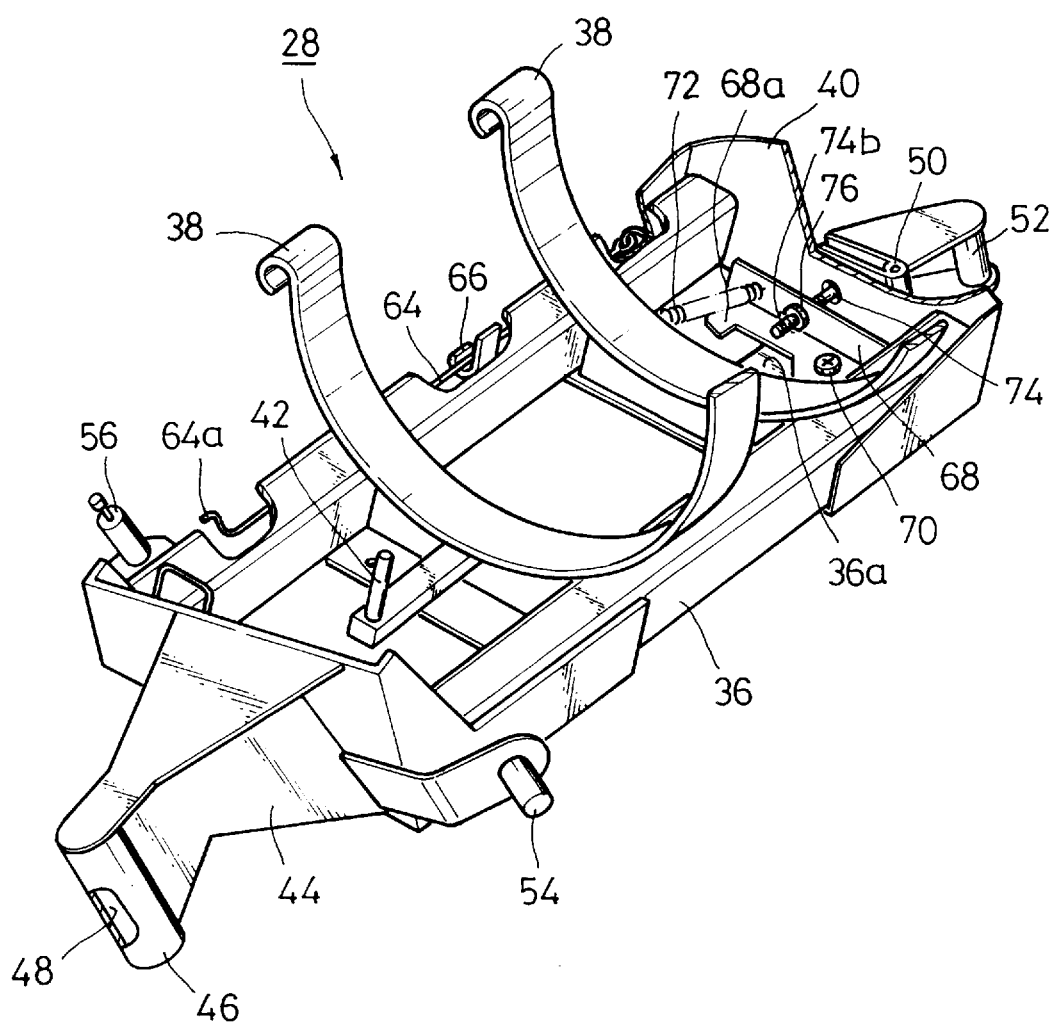
FIG. 3 is a perspective view showing a swing arm pivotably fitted to the pivot pin for swinging movement along a tilted arc.

Turning to FIG. 3, it can be appreciated that the swing arm 28 is provided with a cradle 36 in which the fuel tank 24 lies on its side. The cradle 36 has a clamp set 38 utilized to tie up the fuel thank 24 in a replaceable manner, a ledge 40 allowing the fuel tank 24 to rest against it when the fuel tank 24 is initally placed in the cradle 36, and a locator pin 42 coming into engagement with a positioning hole (not shown) of the fuel tank 24 to enable the fuel tank 24 to be located in an exact position of the cradle 36. Attached to one end of the cradle 36 through a neck member 44 is a pivot socket 46 having a blind bore 48 that may receive the pivot pin 30 of the base plate 26. The orientation of the pivot socket 46 with respect to the cradle 36 is such that, when the swing arm 28 remains just above the counterweight 18, the plane of the cradle 36 is in parallel with the flat top of the counterweight 18.

Attached to the ledge 40 of the swing arm 28 by virture of a hinge 50 is a handle 52 the operator may grip to rotate the swing arm 28 about the pivot pin 30 of the base plate 26. At the proximal end of the cradle 36 of the swing arm 28, a dashpot 54 is provided on one side of the cradle 36 to cushion the last part of the down-swing motion of the swing arm 28. On the opposite side of the cradle 36, an arm bracket 56 extends upwards to retain one ends of an extension spring 58 and an extension damper 60, as clearly illustrated in FIGS. 1, 4 and 5. The other ends of the spring 58 and the damper 60 are fixed to the base plate 26 via a base bracket 62. The extendsion spring 58 helps counterbalance the weight of the arm 28 and the tank 24, while the extension damper 60 helps control the speed of rotation of the arm 28.

Referring again to FIG. 3, it will be seen that a retaining rod 64 with a hook 64a at its free end is carried on the front side of the cradle 36 of the swing arm 28. When unfolded, the retaining rod 64 reaches from the end of the swing arm 28 to the catch 35 of the base plate 26 shown in FIG. 2 so that the hook 64a of the retaining rod 64 can be inserted through the aperture 35a of the catch 35 to lock the swing arm 28 in position. When folded, the retaining rod 64 is slipped into a rod rest 66, allowing itself to be stored along the front side of the swing arm 28. If desired, other arm locking means may be used in place of the combination of retaining rod and catch to lock the swing arm 28 in any arbitrary position. Other examples of the arm locking means includes a chain, a brake, or a ratchet/pawl combination that would allow the operator to lock the swing arm 28 in place.

Figure 6:
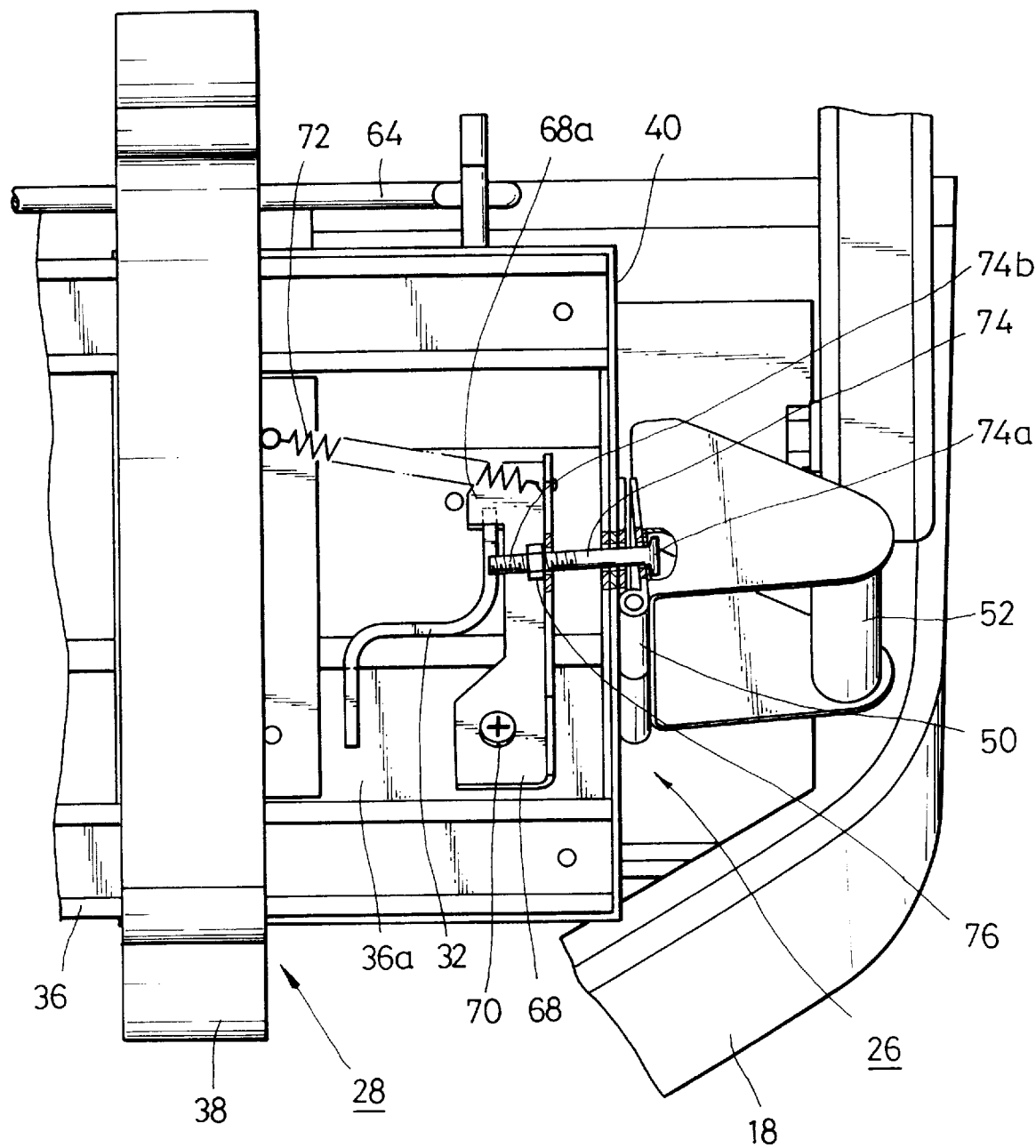
FIG. 6 is a partially cut away, top, view of the fuel tank mount illustrating a latch lever remaining in a latching position.
Figure 7:
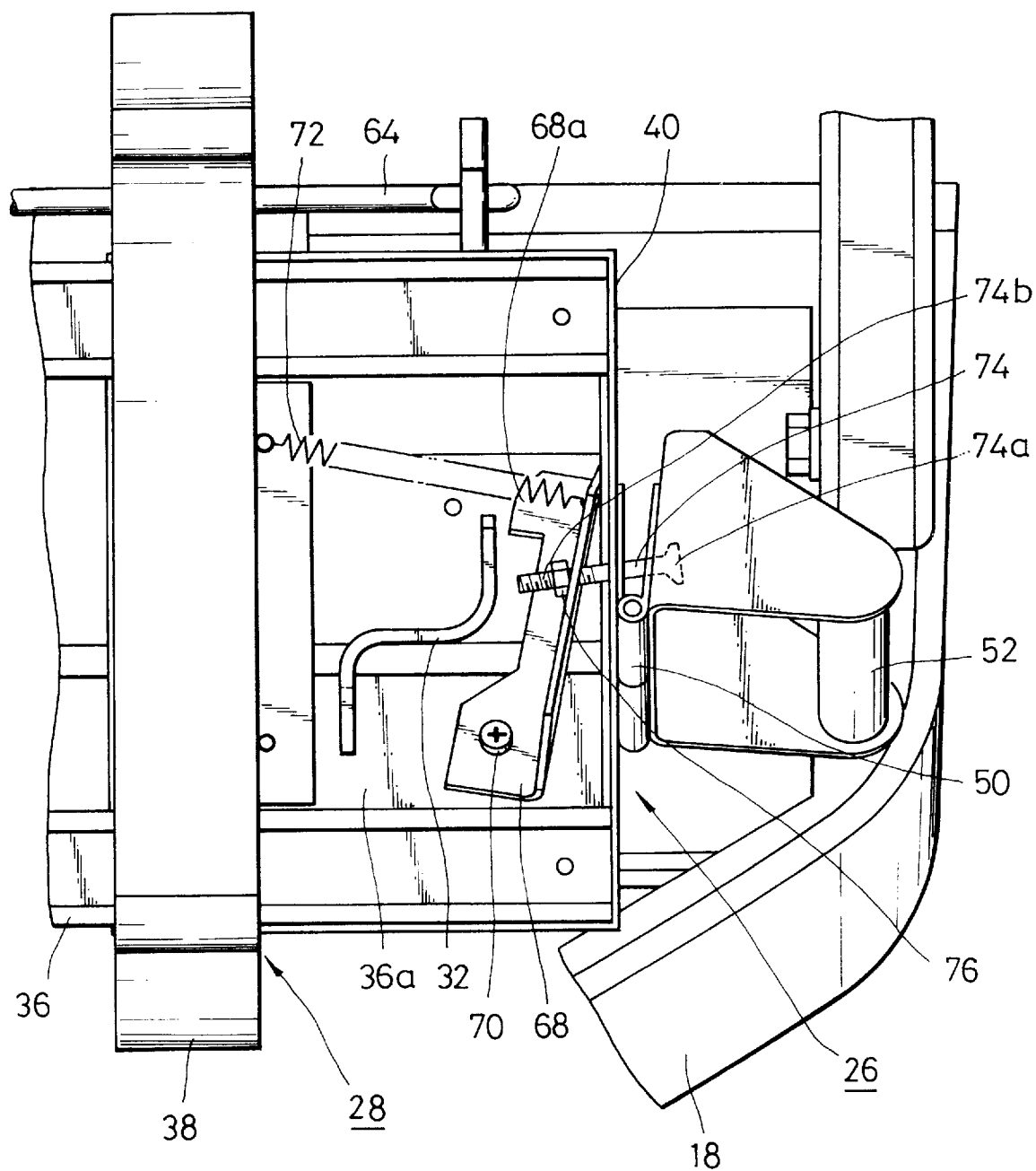
FIG. 7 is a view similar to FIG. 6 but showing the latch lever rotated into an unlatching position as the operator pulls an handle to cause swinging movement of the swing arm.

Just inside the ledge 40 of the swing arm 28, a latch lever 68 is attached at its proximal end to the cradle 36 via a bottom bracket 36a for rotation about a pivot screw 70 between a latching position as shown in FIG. 6 and an unlatching position as illustrated in FIG. 7. The latch lever 68 has a latch claw 68a that would engage the stop edge 32a of the cross piece 32 (see FIG. 2) when the latch lever 68 is in the latching position. A return spring 72 is retained between the distal end of the lever 68 and the cradle 36 of the swing arm 28 to bias the latch lever 68 into the latching position at all times, preventing the swing arm 28 from inadvertent swinging movement relative to the base plate 26. In addition, the latch lever 68 is operatively coupled to the handle 52 by a connecting rod 74 which has an enlarged head 74a at the handle-side end and an external thread 74b at its lever-side end, as most clearly shown in FIG. 6. A nut 76 is threadedly fitted to the external thread 74b of the connecting rod 74 such that, when the operator pulls the handle 52 to move the swing arm 28 off the counterweight 18, the connecting rod 74 may enable the latch lever 68 to be turned into the unlatching position against the biasing force of the return spring 72. Moreover, it will be worth noting that the bottom bracket 36a of the cradle 36 lies underneath the depressor edge 32b of the cross piece 32, whereby the end of the swing arm 28 is held down by the depressor edge 32b, which would prevent the swing arm 28 from moving up and down during movement of the truck.

The swinging movement of the swing arm 28 will be described in greater detail with particular reference to FIGS. 8 through 12. The swing arm 28 may be swung about the tilted pivot pin 30 away from the top of the counterweight 18 toward the side thereof in a manner that the path the fuel tank 24 travels can describe a tilted arc.

During the normal operation of the forklift truck, the swing arm 28 is kept in a home position, as shown in FIG. 1, wherein the fuel tank 24 is held above and laterally across the counterweight 18. While the swing arm 28 is in the home position, the latch lever 68 remains in the latching position under the biasing force of the return spring 72 as illustrated in FIG. 6, thus inhibiting inadvertent swinging movement of the swing arm 28 out of the home position. Up and down movement of the swing arm 28 in the home position is also suppressed because the bottom bracket 36a of the cradle 36 will be held down by the depressor edge 32b of the cross piece 32.

Figure 8:
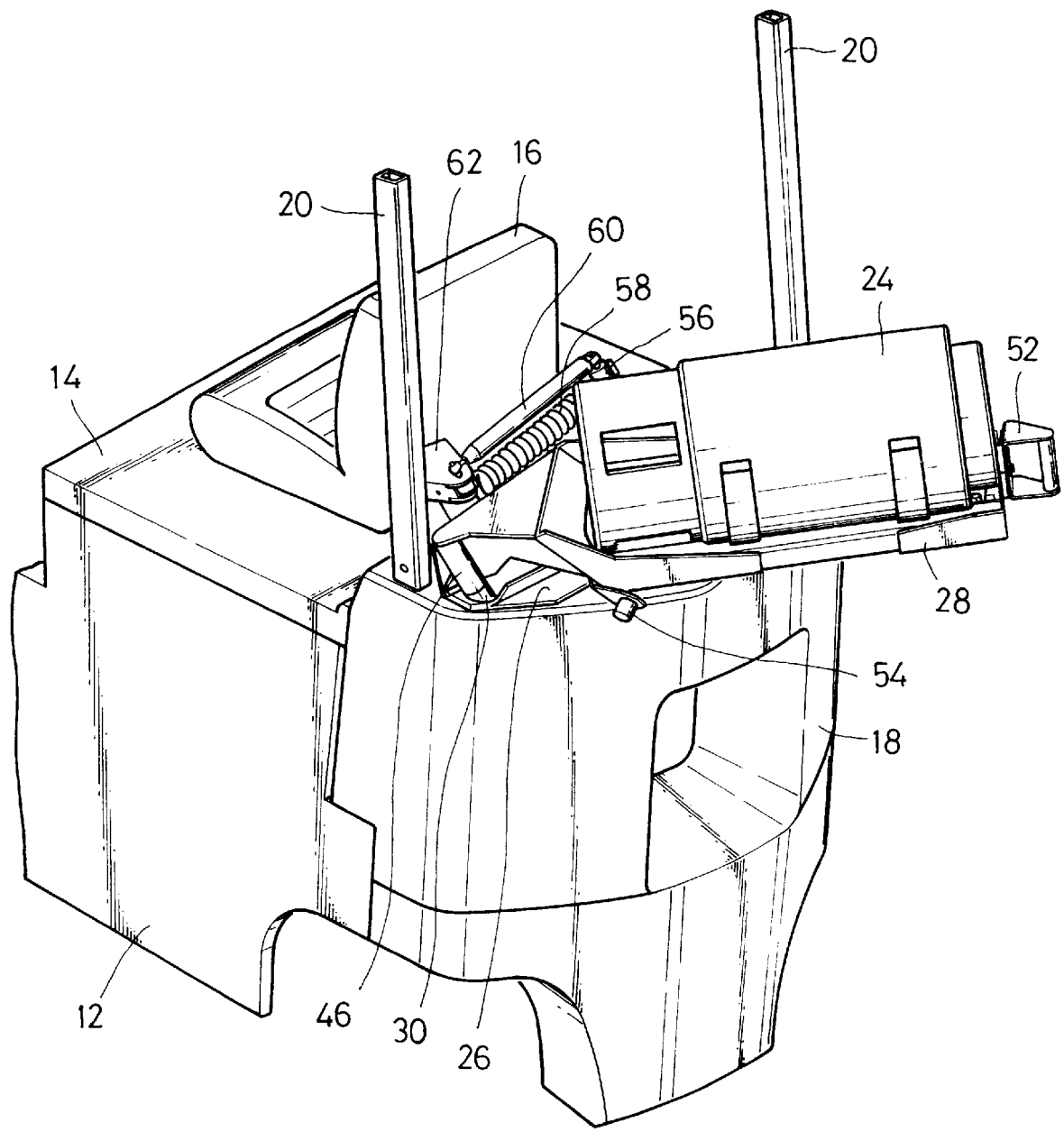
FIG. 8 depicts the swing arm moved 50 degrees off the home position shown in FIG. 1 into a neutral position wherein the fuel tank is at the highest elevation.

If the operator pulls the handle 52 rearwardly to move the swing arm 28 out of the home position, the handle 52 will be slightly rotated clockwise about the hinge 50 as shown in FIG. 7, whereby the latch lever 68 moves into the unlatching position against the biasing force of the return spring 72. When the swing arm 28 is further rotated away from the home position to the left, it moves slightly up over the rear of the counterweight 18 into a neutral position which is about 50 degrees off the home position, as shown in FIG. 8. In the neutral position, the swing arm 28 and the fuel tank 24 are at its highest elevation, i.e., at the top of the tilted arc, and there are no forces tending to move them leftwardly or rightwardly. When the arm 28 is in the neutral position, the extension spring 58 and the damper 60 are at their minimum lengths. As the arm 28 is lowered from the neutral position either towards the top of the counterweight 18, i.e., the home position, or down to the ground, the spring 58 and the damper 60 would extend, thereby providing a counterbalancing force. Such a spring and damper arrangement would help prevent injury or damage by slowing the arm 28 should the operator allow it to swing free.

Figure 9:
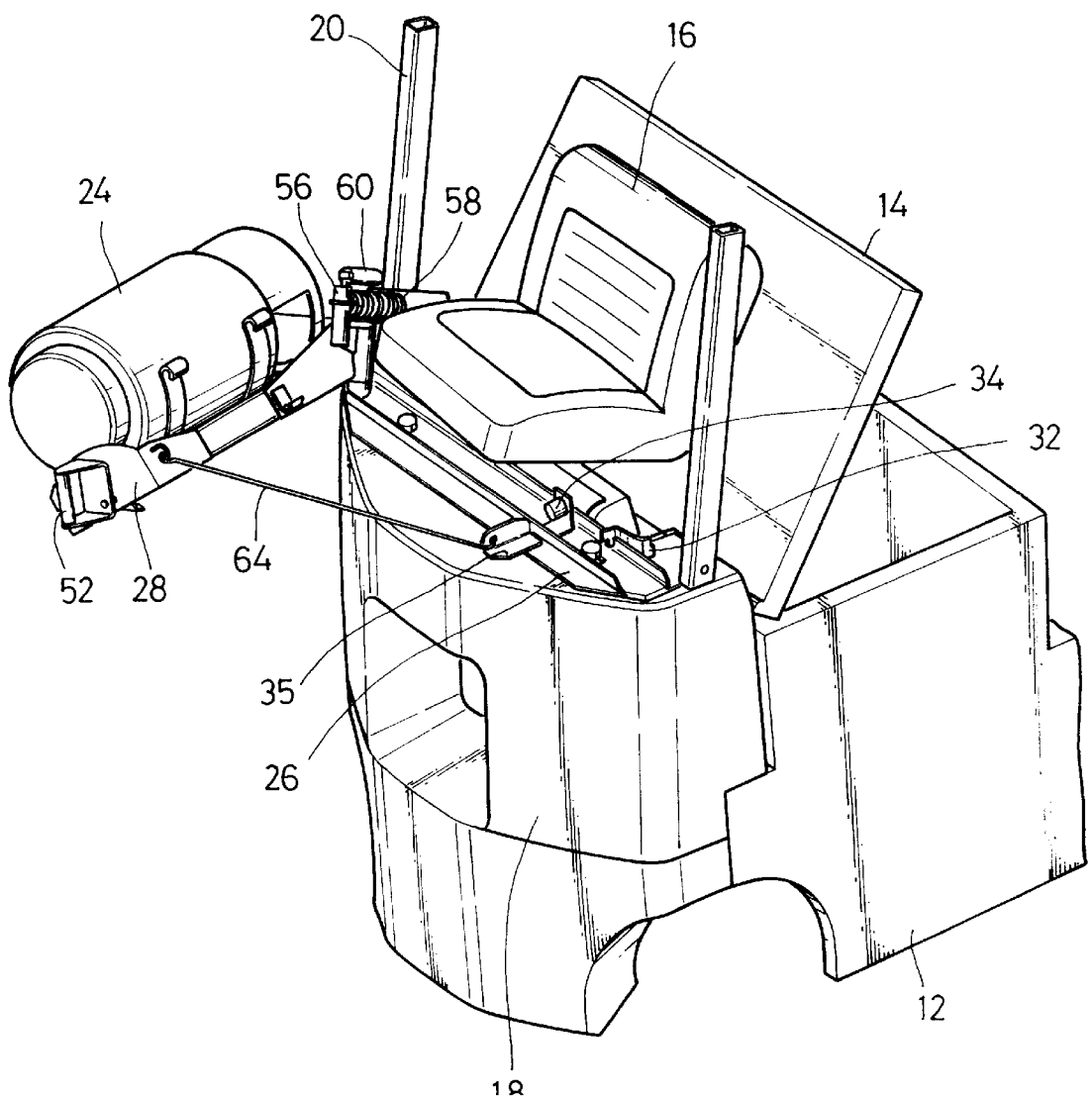
FIG. 9 represents the swing arm further swung from the neutral position into a 75° position, with the hood opened for engine maintenance and the arm locked in place by means of a retaining rod.

Further rotation of the swing arm 28 to the left from the neutral position will cause it to move slightly down along the tilted arc into a temporary locking position which is about 75 degrees off the home position, as shown in FIG. 9. In this position, there are weak forces tending to move the swing arm 28 leftwardly. By engaging the retaining rod 64 with the catch 35 of the base plate 26 at this point, the swing arm 28 can be locked in place some distance off the counterweight 18. This provides room for the operator's seat 16 to swing up over the counterweight 18 when the hood 14 is opened. Alternative or additional detents or other locking means can be incorporated in the fuel tank mount 22 to permit the swing arm 28 to be locked in any arbitrary position. If desired, the swing arm 28 may be locked in the neutral position rather than the temporary locking position.

Figure 10:
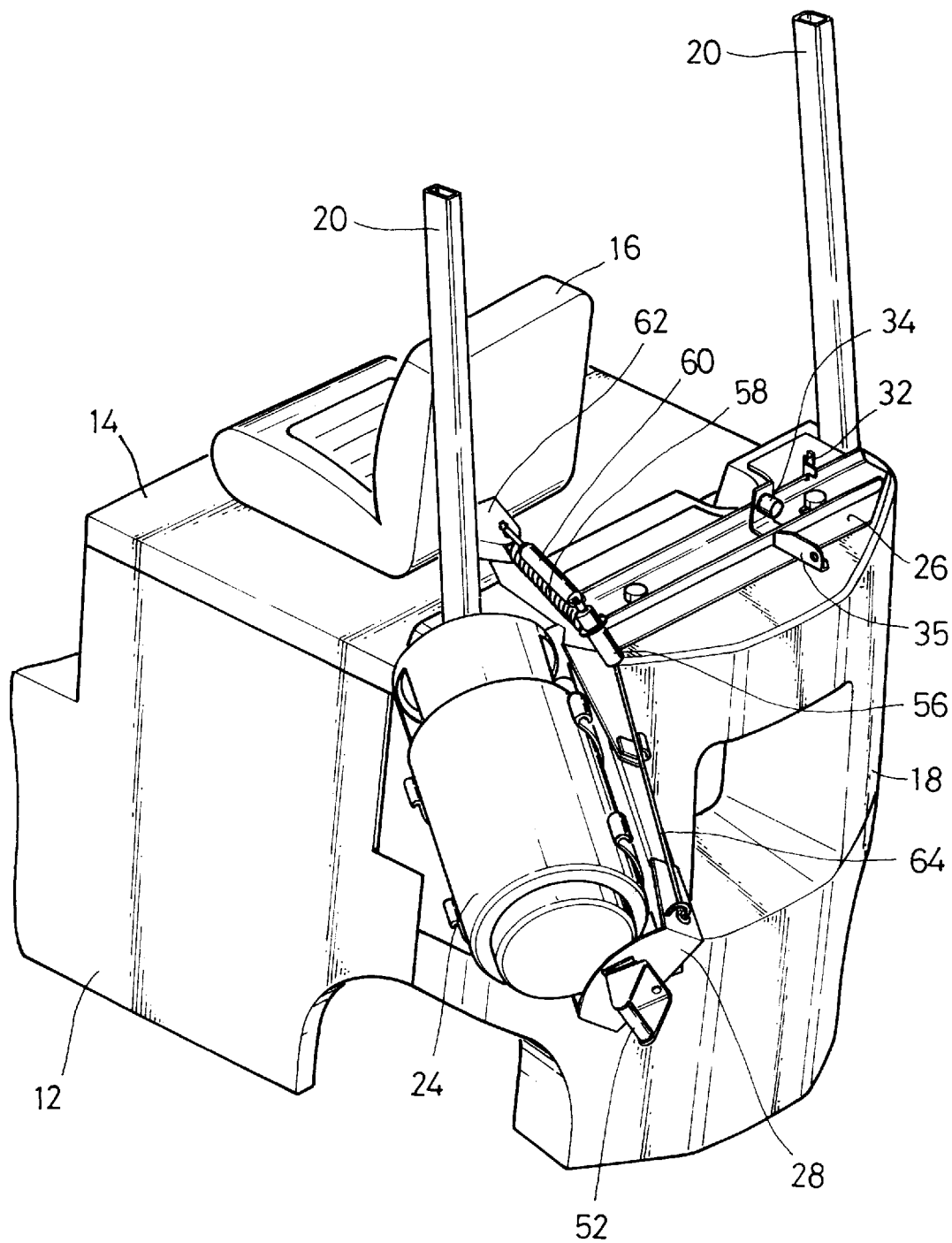
FIG. 10 shows the swing arm even further swung from the 75° position into a 140° position.
Figure 11:
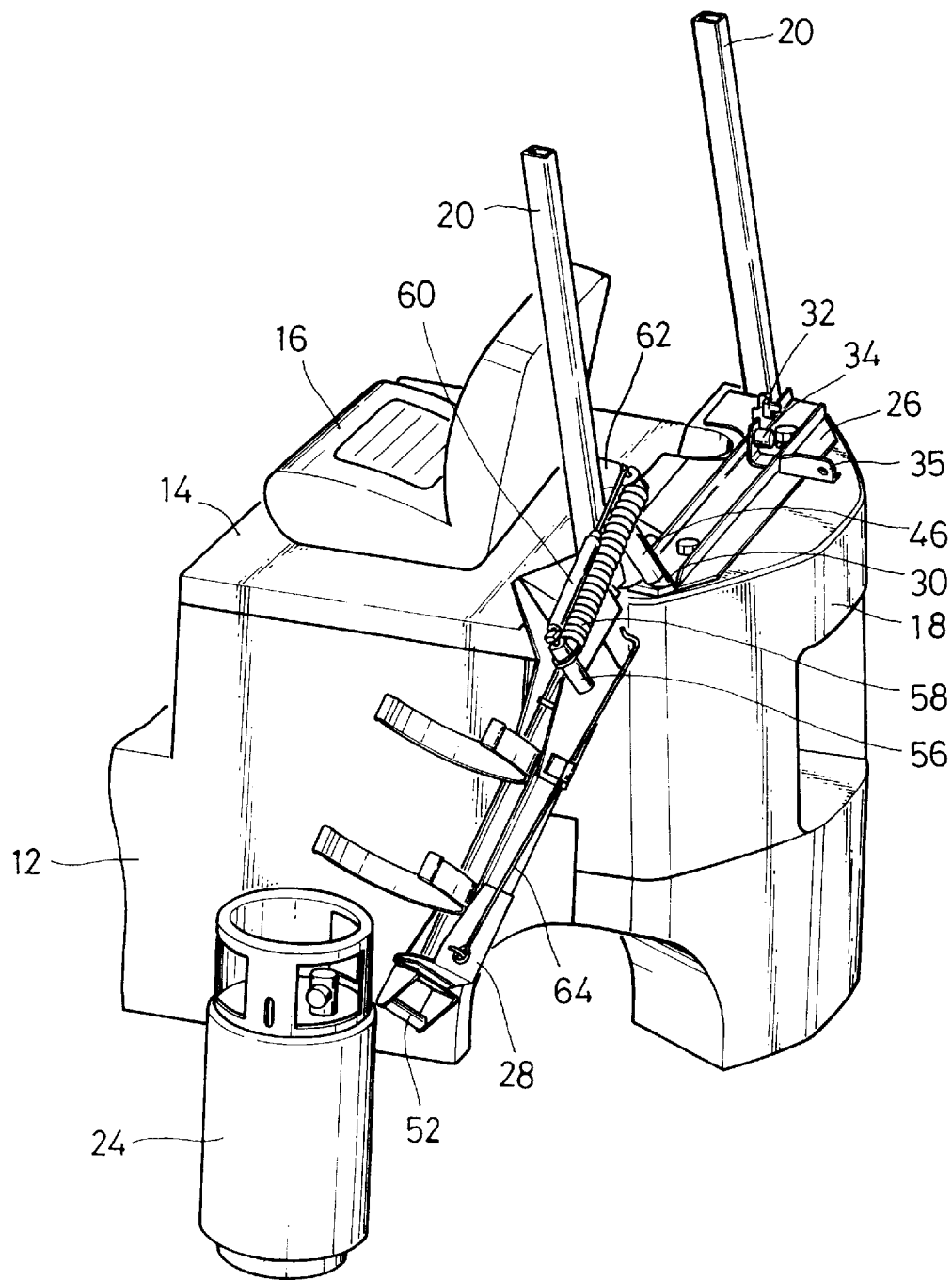
FIG. 11 illustrates the swing arm swung 215 degrees off the home position into a tank changing position wherein the fuel tank is oriented substantially vertically alongside the counterweight.
Figure 12:
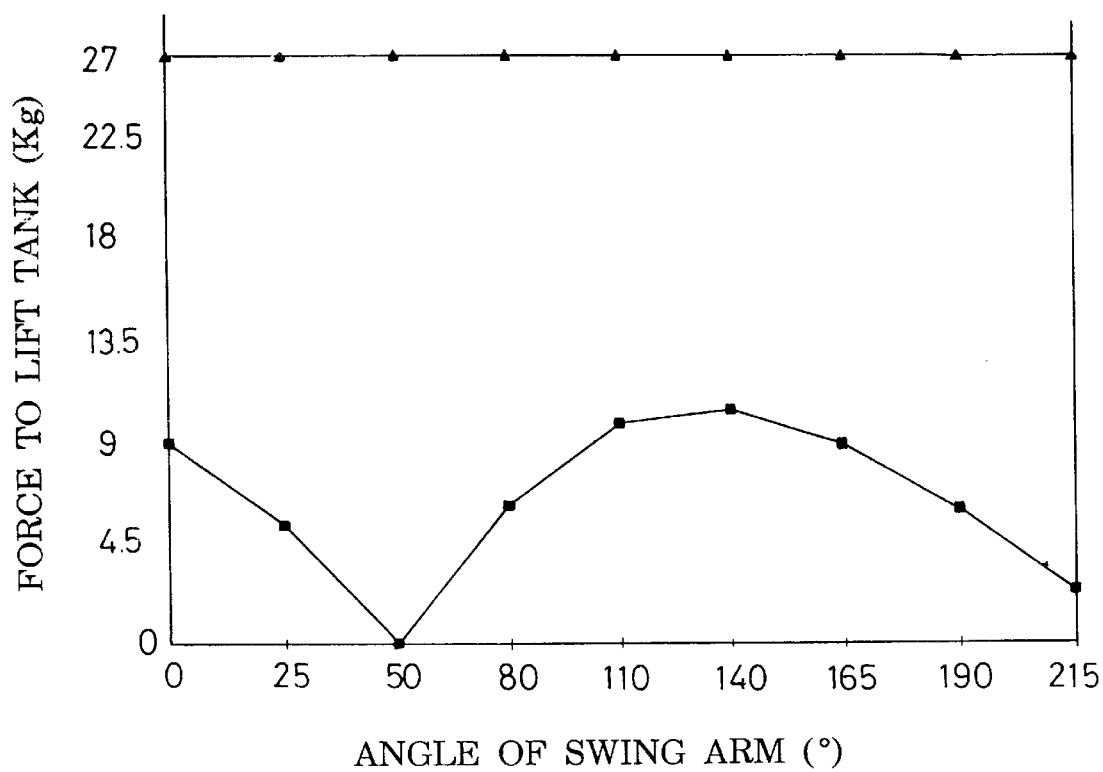
FIG. 12 is a graphical representation plotting the lift forces against the swing angle, with the diamond dot curve representing the lift force needed in the fuel tank mount with a swing arm and the triangle dot curve without the swing arm.

As the swing arm 28 is further rotated downwards from the temporary locking position, it would pass a 140° position as shown in FIG. 10 and, at the terminus of the down-swing movement, reaches a tank changing position which is about 215 degrees off the home position, as depicted in FIG. 11. With the swing arm 28 alongside the counterweight 18 in this position, the fuel tank 24 is oriented nearly vertically to assist the operator in loading and unloading the fuel tank 24 into and out of the cradle 36 of the swing arm 28. This is important since typically fuel tanks are stored vertically and brought to the forklift truck by dragging or carrying the tanks with the use of handles built to its top. The vertical orientation means that to load the fuel tank 24 the operator only has to lift the tank 24 about 50 cm off the floor, rest it on the ledge 40 of the cradle 36 and tip it into the clamp set 38. The clamp set 38 can then be tightened and the feed hose (not shown) leading to an engine is connected to the fuel tank 24 while the latter is easily accessible. When the tank 24 is tightened in the cradle 36, the swing arm 28 can be swung up into the home position over the top of the counterweight 18 and latched in place.

As fully set forth above, since the swing arm 28 in the instant fuel tank mount 22 is pivotally attached to the tilted pivot pin 30, it can move slightly up over the rear of the counterweight and then down to the side of the forklift truck along a tilted arc which begins at the home position and ends at the tank changing position. This provides a mechanical advantage essentially equivalent to a ramp, thus easing the task of loading and unloading the fuel tank 24. The combination of extension spring 58 and damper 60 would help counterbalance the weight of the arm 28 and the tank 24 and help control the speed of rotation of the arm 28, thus reducing the risk of injury or damage which would otherwise be significant in the tank lift procedure.

While the exact geometry will vary for different size trucks, the typical swing arm of the invention helps reduce the peak force the operator sees in the lifting process by more than one half. The reduction of the forces needed to lift the fuel tank 24 is graphically illustrated in FIG. 9 wherein the diamond dot line represents the lift force variation in the inventive fuel tank mount, the triangle dot line showing the lift force in the conventional fuel tank mount without the swing arm. The angle of swing arm in FIG. 9 is measured from the home position from which the arm begins to swing toward the tank changing position.

While the invention has been shown and described with reference to a preferred embodiment, it should be apparent to one of ordinary skill that many changes and modifications may be made without departing from the spirit and scope of the invention as defined in the claims.

What is claimed is:

1. A fuel tank mount for forklift trucks adapted to hold a fuel tank in place, comprising: a counterweight; a swing arm replaceably carrying the fuel tank and swingable about a tilted pivot axis from the top of the counterweight to the side thereof, said pivot axis tilted both forwards at a first tilt angle and outboards at a second tilt angle with respect to a vertical axis; and means for limiting rotation of the swing arm while the arm is caused to rotate.

2. The fuel tank mount for forklift trucks as recited in claim 1, wherein the swing arm has a home position wherein the tank is held above and laterally across the counterweight and a tank changing position wherein the tank lies alongside the counterweight.

3. A fuel tank mount for forklift trucks adapted to hold a fuel tank in place, comprising: a counterweight; a swing arm replaceable carrying the fuel tank and swingable about a tilted pivot axis from the top of the counterweight to the side thereof; and means for limiting rotation of the swing arm while the arm is caused to rotate;

wherein the swing arm has a home position wherein the tank is held about and laterally across the counterweight and a tank changing position wherein the tank lies alongside the counterweight;

wherein the swing arm further has a neutral position wherein the tank remains at its highest elevation.

4. The fuel tank mount for forklift trucks as recited in claim 1, wherein the first tilt angle is about 26 degrees and the second tilt angle is about 25 degrees.

5. The fuel tank mount for forklift trucks as recited in claim 3, wherein the rotation limiting means comprises an extension spring retained between the counterweight and the swing arm for counterbalancing the weight of the arm and the fuel tank.

6. The fuel tank mount for forklift trucks as recited in claim 5, wherein the rotation limiting means further comprises an extension damper retained between the counterweight and the swing arm for reducing the speed of rotation of the swing arm when the arm moves out of the neutral position.

7. The fuel tank mount for forklift trucks as recited in claim 3, further comprising a base plate fixedly secured to and extending laterally across the top of the counterweight, the base plate having a pivot pin projecting upwards from one lateral end of the plate to pivotally support the swing arm, the pivot pin tilted both forwards at a first tilt angle and outboards at a second tilt angle with respect to a vertical axis.

8. The fuel tank mount for forklift trucks as recited in claim 7, wherein the first tilt angle is about 26 degrees and the second tilt angle is about 25 degrees.

9. The fuel tank mount for forklift trucks as recited in claim 7, wherein the swing arm is provided with a cradle for holding the fuel tank on its side, a pivot socket attached to one side of the cradle and having a bore for receiving the pivot pin of the base plate, and a handle hingedly mounted to the other side of the cradle in an opposed relationship with the pivot socket.

10. The fuel tank mount for forklift trucks as recited in claim 9, further comprising means for latching the swing arm in the home position.

11. The fuel tank mount for forklift trucks as recited in claim 10, wherein the latching means comprises:

cross piece attached to and across the base plate and having a stop edge at its forward end;

a latch lever pivoted at its proximal end to the cradle of the swing arm and having a latch claw at its distal end, the latch lever swingable between a latching position in which the latch claw engages with the stop edge of the cross piece and an unlatching position in which the latch claw is out of engagement with the stop edge;

a return spring retained between the distal end of the latch lever and the cradle of the swing arm for normally biasing the latch lever into the latching position; and means for operatively coupling the latch lever to the handle so that the latch lever is turned into the unlatching position as the handle is being pulled away from the cradle.

12. The fuel tank mount for forklift trucks as recited in claim 11, wherein the cross piece is further provided at its rear end with a depressor edge for holding down the swing arm in the home position.

13. The fuel tank mount for forklift trucks as recited in claim 3, further comprising means for locking the swing arm in place some distance off the home position.

14. The fuel tank mount for forklift trucks as recited in claim 3, further comprising means for cushioning the last part of motion of the swing arm as the arm moves from the home position toward the tank changing position and vice versa.

15. A fuel tank mount for forklift trucks adapted to hold a fuel tank in place, comprising:

a counterweight;

a base plate fixedly secured to and extending laterally across the top of the counterweight, the base plate having a tilted pivot pin projecting upwards from one lateral end of the plate;

a swing arm replaceably carrying the fuel tank and pivotally mounted to the pivot pin for rotation from the top of the counterweight to the side thereof; and means for limiting rotation of the swing arm while the arm is caused to rotate.

16. The fuel tank mount for forklift trucks as recited in claim 15, wherein the swing arm has a home position wherein the tank is held above and laterally across the counterweight and a tank changing position wherein the tank lies alongside the counterweight.

17. The fuel tank mount for forklift trucks as recited in claim 16, wherein the swing arm further has a neutral position wherein the tank remains at its highest elevation.

18. The fuel tank mount for forklift trucks as recited in claim 15, wherein the pivot pin is tilted both forwards at a first tilt angle and outboards at a second tilt angle with respect to a vertical axis.

19. The fuel tank mount for forklift trucks as recited in claim 18, wherein the first tilt angle is about 26 degrees and the second tilt angle is about 25 degrees.

20. The fuel tank mount for forklift trucks as recited in claim 15, wherein the swing arm is provided with a cradle for holding the fuel tank on its side, a pivot socket attached to one side of the cradle and having a bore for receiving the pivot pin of the base plate, and a handle hingedly mounted to the other side of the cradle in an opposed relationship with the pivot socket.

21. The fuel tank mount for forklift trucks as recited in claim 17, wherein the rotation limiting means comprises an extension spring retained between the counterweight and the swing arm for counterbalancing the weight of the arm and the fuel tank.

22. The fuel tank mount for forklift trucks as recited in claim 21, wherein the rotation limiting means comprises an extension damper retained between the counterweight and the swing arm for reducing the speed of rotation of the swing arm when the arm moves out of the neutral position.

23. The fuel tank mount for forklift trucks as recited in claim 17, further comprising means for latching the swing arm in the home position.

24. A fuel tank mount for forklift trucks adapted to hold a fuel tank in place, comprising:

a counterweight;

a base plate fixedly secured to and extending laterally across the top of the counterweight, the base plate having a tilted pivot pin projecting upwards from one lateral end of the plate;

a swing arm replaceably carrying the fuel tank and pivotally mounted to the pivot pin for rotation between a home position wherein the tank is held above and laterally across the counterweight, a neutral position wherein the tank remains at its highest elevation and a tank changing position wherein the tank lies alongside the counterweight; and means for limiting rotation of the swing arm as the arm is subjected to rotation from the neutral position into the home position or the tank changing position.

25. The fuel tank mount for forklift trucks as recited in claim 24, wherein the pivot pin is tilted both forwards at a first tilt angle and outboards at a second tilt angle with respect to a vertical axis.

26. The fuel tank mount for forklift trucks as recited in claim 25, wherein the first tilt angle is about 26 degrees and the second tilt angle is about 25 degrees.

* * * * *